United States Patent
Russell

(10) Patent No.: US 11,583,782 B2
(45) Date of Patent: Feb. 21, 2023

(54) MODULAR AIRFOIL SYSTEM

(71) Applicant: J. Russell Consulting, Inc., Melbourne, FL (US)

(72) Inventor: Jason Russell, Melbourne, FL (US)

(*) Notice: Subject to any disclaimer, the term of this patent is extended or adjusted under 35 U.S.C. 154(b) by 702 days.

(21) Appl. No.: 16/439,644

(22) Filed: Jun. 12, 2019

(65) Prior Publication Data
US 2019/0374868 A1    Dec. 12, 2019

Related U.S. Application Data

(60) Provisional application No. 62/684,103, filed on Jun. 12, 2018.

(51) Int. Cl.
| | | |
|---|---|---|
| *A63H 27/00* | (2006.01) | |
| *A63H 33/06* | (2006.01) | |
| *A63H 33/08* | (2006.01) | |

(52) U.S. Cl.
CPC ............ *A63H 27/001* (2013.01); *A63H 27/00* (2013.01); *A63H 33/062* (2013.01); *A63H 33/086* (2013.01); *A63H 33/088* (2013.01); *B64C 2211/00* (2013.01)

(58) Field of Classification Search
CPC ...... A63H 27/00; A63H 27/001; A63H 27/02; A63H 33/086
See application file for complete search history.

(56) References Cited

U.S. PATENT DOCUMENTS

| | | | | |
|---|---|---|---|---|
| 4,494,940 A | * | 1/1985 | Gretz ...................... | A63H 27/02 446/61 |
| 6,224,451 B1 | * | 5/2001 | Lai .......................... | A63H 27/02 403/374.1 |
| 6,425,794 B1 | * | 7/2002 | Levy ...................... | A63H 27/02 446/61 |
| 7,237,750 B2 | * | 7/2007 | Chiu ...................... | A45C 13/02 244/119 |
| 8,939,810 B1 | * | 1/2015 | Suknanan .............. | A63H 27/02 446/93 |
| 10,661,882 B2 | * | 5/2020 | Haley .................. | A63H 27/001 |

* cited by examiner

*Primary Examiner* — John A Ricci
(74) *Attorney, Agent, or Firm* — Lowndes; Stephen C. Thomas

(57) ABSTRACT

A modular wing, adapted to be used on a flying device such as a toy airplane, drone, or other small fixed wing flying device, or form a part of a wind turbine or any other apparatus that requires a wing or blade, that is compatible with all block-based toy systems such as LEGO®, DECOOL® or KAZI®. The modular wing is comprised of a series of modular aerodynamic surfaces that may be suitable for manufacture by a low-cost method such as molding or additive manufacturing such as 3D printing, typically but not necessarily from plastic, to form wing sub elements which, when assembled together, form a wing or blade such as an airplane wing or turbine blade. The modular wing may comprise cambered or symmetric wing shapes. The modular wing may be used in a static display model fully flying aerodynamic aircraft, sailing hydrodynamic boat, or aerodynamic functioning turbine.

22 Claims, 17 Drawing Sheets

MODULAR AIRFOIL SYSTEM

CROSS REFERENCE TO RELATED APPLICATIONS AND INCORPORATION BY REFERENCE

This non-provisional patent application filed in the United States Patent and Trademark Office (USPTO) is a non-provisional of and claims the benefit of U.S. provisional patent application 62/684,103 titled MODULAR AIRFOIL SYSTEM, which was filed in the USPTO on Jun. 12, 2018, and which is incorporated herein by reference in its entirety.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISK

Not applicable.

BACKGROUND OF THE INVENTION

1. Field of the Invention

The field of the invention relates generally to wings, rotors or turbine blades which may be assembled from modular components and attached to other structures such as a fixed wing airplane fuselage or rotor or turbine support structure. Additionally, in an embodiment, the modular wing of the invention is adaptable to be used in conjunction with modular toy assembly systems such as, for example and not by way of limitation, systems which utilize stud and receiver type assembly structures.

2. Background Art

There exists in the prior art systems for assembling reconfigurable structures, such as, for example, those known as LEGO®, DECOOL® or KAZI®. These reconfigurable systems typically utilize a means for assembling two or more elements together using one or more, and typically, a plurality of attaching structures that each comprise a stud or dowel on a first structure that is adapted to be received by a recess, or hole, on a second structure. The recess or hole is adapted to receive the stud or dowel in a slight press fit such that when a stud or dowel is pressed into a recess, or hole, a removable attachment is created between the stud or dowel and the recess or hole. In the case where a plurality of stud-recess or dowel-hole pairs are utilized, the stud and recess structures are typically arranged in a predefined pattern, enabling a plurality of stud and recess structures to be pressed together forming a removable attachment between them. The predefined pattern may be, for, example, arranged on a grid pattern, allowing the first and second structures to be reconfigured by detaching them, rotating them relative to one another by 180 degrees, and re-attaching them by pressing them together. The first structure and the second structure may each comprise a plurality of such stud-recess pairs. Thus, when a first structure comprising a plurality of stud structures is pressed against a second structure comprising a plurality of recess structures, the first and second structures are removably attached to one another. This method for assembly of structures together may be termed a "stud-and-receiver", "dowel-hole", or "stud-recess" structure, although there exist other terms in the art that may refer to the same structure.

Toy systems such as LEGO®, DECOOL® or KAZI® utilize the stud-receiver structure. These systems are typically used to create passive resulting structures for use in displays and the like. The resulting structures are easily reconfigurable. Some structures are not passive and may comprise moving parts, such as toy robots configured from the stud-recess structure. These robots may contain small motors and rotary joints enabling articulation of portions of the assembled structure.

However, there are no past or existing structures that are adapted to create wings, blades, or any air foil structure such that it is possible to assemble a reconfigurable airplane, submarine or other structure that has wings, blades or such air foils. It would be desirable that the concept of rapidly reconfigurable structures be extended to the assembly of structures that utilize wings or blades such as, for example, airplane wing structures, wind mills, wind turbines, rotary wing aircraft or other structures, enabling the reconfigurable assembly of fixed and rotary wing aircraft and vehicles for use in water utilizing such wings, blades or air foils. It would be further desirable that the wings or blades be modular so that they may be utilized to create a large variety of diverse structures quickly at the desire of the user.

The present invention overcomes these shortcomings of the prior art. The present invention's ability to enable rapid reconfiguration of a wing, blade, aircraft, windmill or other aerodynamic or hydrodynamic capable structure, which is not currently in the art, allows for reconfiguration of toys and rapid prototyping without the need for tools.

BRIEF SUMMARY OF THE INVENTION

The present invention comprises an apparatus and method that have one or more of the following features and/or steps, which alone or in any combination may comprise patentable subject matter.

The present invention overcomes the shortcomings of the prior art in that it allows for the quick assembly, disassembly and reconfiguration of wing, blade or foil structures (each of which are individually and collectively referred to herein simply as a "wing", "blade" or "foil") that are usable with stud-and-receiver assembly systems such as those manufactured by LEGO®, DECOOL® or KAZI®. The reconfigurable wing or blade structures of the invention allow for the quick build and reconfiguration of desirable apparatuses such as toy airplanes, wind mills, and the like which may be mechanically and aerodynamically operable. Furthermore, the reconfigurable wing or blade structures of the invention allow for the quick build and reconfiguration of prototypes that are useful, for example, during aircraft, helicopter, submarine or other vehicle design. For example, an airplane such as a toy airplane may be assembled quickly using a modular wing of the invention. An airplane thus assembled using the modular wing of the invention may be able to fly, for example, as a Radio Controlled (RC) airplane. When it is desired to reconfigure the airplane, the modular wing of the invention may be removed from the airplane fuselage easily due to the use of a stud-recess design of the wing attachment to the aircraft, the wing may be re-configured using its modular components or may be replaced entirely with an alternate wing having desired characteristics, the modular wing may then be re-attached to the fuselage, and the assembled airplane is immediately ready to fly. This process of reconfiguration may take mere minutes. In this manner, the modular wing of the invention enables rapid reconfiguration of a toy airplane, wind mill, submarine or any structure that utilizes a wing, blade, air foil or other similar structure.

In accordance with one embodiment of the present invention, the invention comprises modular wing or blade sections that assemble together to form a completed modular wing or blade. The modular wing or blade is attachable to another structure, such as an airplane fuselage or windmill, using stud-and-receiver assembly structures. These stud-and-receiver assembly structures may be, in an embodiment, standard structures such as those utilized by LEGO®, DECOOL® or KAZI® toy building systems.

Historically, toy blocks of the prior art have been a non-functional toy designed to provide the appearance of mechanical features such as engines, pistons, drives and gears. However the prior art is non-functional in that it does not provide wing, blade or foil cross sections that generate lift, or provide any aerodynamic of hydrodynamic cross section, that would enable the assembled toy or prototype to fly through a fluid and produce lift. In contrast, the wing, blade, and airfoil sections and elements of the present invention are novel in that, among other things, they add an aeronautical element that does not exist with the prior art mechanical design, enabling functional flying through a fluid. Said another way the elements of the present invention provide wing, blade or foil cross sections that produce lift when motivated through a fluid. Thus the present invention provides aerodynamic surfaces in air or operational hydrodynamic surfaces in water or any other fluid.

Moreover, the airfoils, wings and blades of the invention are modular, allowing for flexibility during assembly. They can be assembled in all manner of arrangements, for example: single wings, bi-plane wings, tri-plane wings, box wings, windmill arrangements, propeller arrangements or hydrofoil arrangements etc., using parts of existing available toys to provide mating connectivity between airfoils. The present invention is also simple to fabricate: in embodiments, only two elements of the present invention may provide multiple permutations of wing planform designs.

The invention overcomes a shortcoming in the prior art in that it is easily aerodynamically reconfigurable at the desire of the user. Thus, for example, an airplane comprising a modular wing of the invention may start as a single-wing fixed wing airplane, and then rapidly be reconfigured into a biplane configuration. The present method and device of the invention overcome the shortcomings of the prior art by enabling the rapid assembly and reconfiguration of devices that utilizes wing, blade or foil structures.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating the preferred embodiments of the invention and are not to be construed as limiting the invention. In the drawings.

Figure 1:
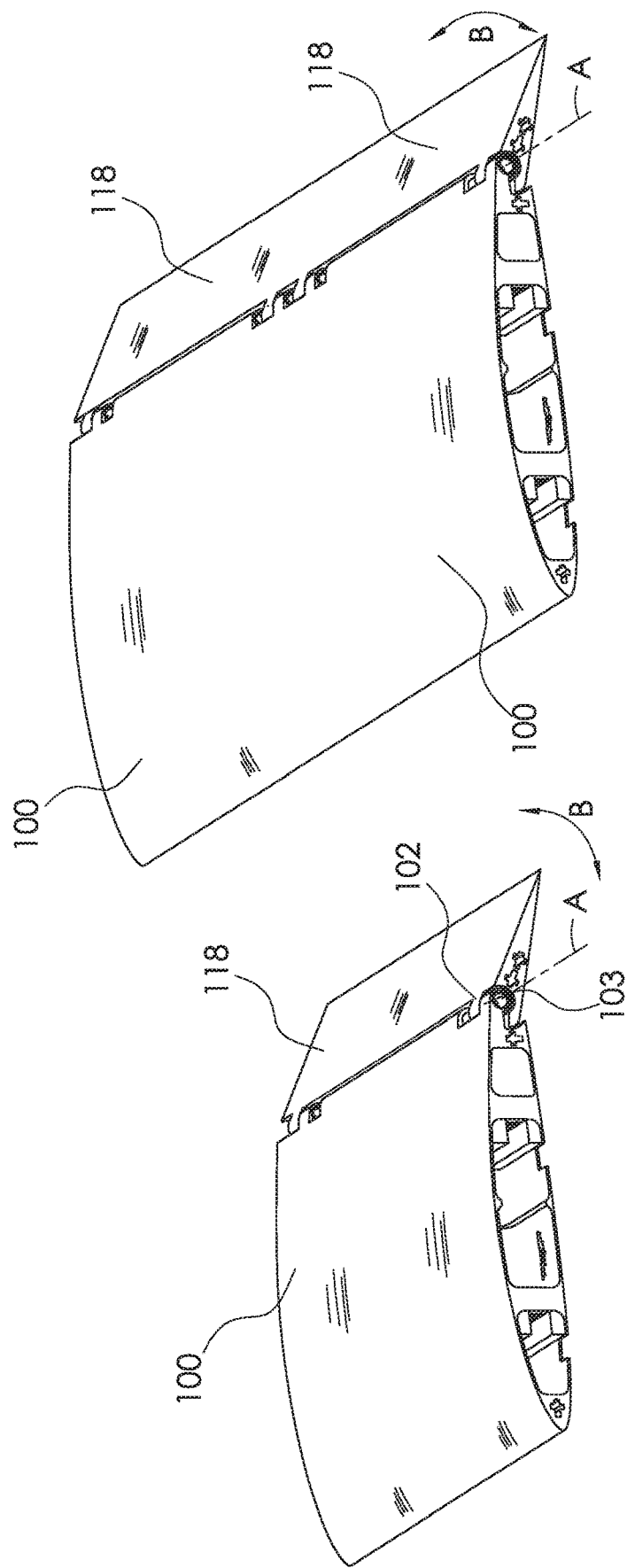
FIG. 1 depicts a perspective view of a sub-element of an embodiment of the invention, and an assembly of two sub-elements with the connecting stud-recess elements hidden within structure.

In the figures, like callouts refer to like features.

DETAILED DESCRIPTION OF THE INVENTION

The following documentation provides a detailed description of the invention.

Although a detailed description as provided in the attachments contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention. Thus the scope of the invention should be determined by the appended claims and their legal equivalents, and not merely by the preferred examples or embodiments given.

Generally, the invention may comprise one or more wings or blades that are each comprised of one or more sub-elements, wherein the wings or blades are directly compatible with, and removably attachable to, block based toy systems such as LEGO®, DECOOL® or KAZI®. The invention may comprise a plurality of modular aerodynamic streamlined surfaces, such as for example, an airfoil, that can be combined with block based toy systems such as LEGO®, DECOOL® or KAZI® to form static display or functional, flying aircraft, wind turbine or airship or rotorcraft or propeller systems; or static or functional, propulsive hydrofoil or hydrodynamic propeller systems, or automotive lift or downforce systems. The sub-elements of the invention may be, in an embodiment, fabricated from high tolerance plastic injection molding or by 3-D printing or additive manufacturing. An exemplary material used in producing the invention is ABS plastic, however other materials may be used. Materials of construction may have the following properties: specific gravity: 1.05 g/cm$^3$, tensile strength: 44 Mpa; and elongation at break between 23-25%.

As used herein, "airfoil", "wing", "blade" or "foil" means a structure with a cross-sectional shape that produces an aerodynamic force or fluid dynamic force when motivated through a fluid. The component of this force perpendicular to the direction of motivation is called lift. Airfoils may take a number of cross sections as is known in the art.

The part dimensions of the invention may be consistent with existing mating toy system geometry (e.g. the LEGO®, stud-recess removable attachment system). The modular sub-elements may comprise cambered wing surfaces, symmetrical wing surfaces, and wing tips.

The cambered wing surfaces of the invention may employ a non-symmetrical, cambered airfoil section and trailing edge hinged flap system in which a flap or a plurality of flaps are rotably or hingedly attached to a trailing edge of the modular wing. As non-limiting examples, the non-symmetrical, cambered airfoil section can be employed as a mono plane, tri-plane, tandem wings, winglets, diamond or box wings, or combinations thereof, forming a plurality of wing configurations.

In an embodiment, the trailing edge flap hinge can be locked to create a fixed surface, or can be free to create a hingedly attached moving surface.

The available cambered airfoil profile designs can be manufactured via modular manufacturing processes. Likewise, in embodiments, the trailing edge flap, leading edge flap and slat designs may be applied to the wing elements surface through a modular manufacturing process.

The cambered wing sub-elements of the invention can be joined or connected together to form larger span wings by virtue of their common connection system.

During connection, the flaps comprise a quick attachment feature that allows various semi-spans to be connected to allow interconnected driving of the adjacent flap surface, or, the connection can remain free allowing partial flapped sections of wing. This quick attachment feature is, for example, a stud-recess removable attachment.

The cambered wings may comprise any cambered aerodynamic profile shape; any chord, for example, and not by way of limitation, up to and including 1 meter in length and longer; any semi-span for example, and not by way of limitation, up to 1 meter in length and longer; any wing taper ratio; and any wing sweep.

The modular sub-elements include a wingtip sub-element. In an embodiment, his wingtip section may be a tip reflecting all current, toy aircraft configurations or as a winglet for all current, toy aircraft winglet configurations.

All symmetrical wing surfaces may employ a symmetrical, airfoil section and proprietary trailing edge hinged flap system. The symmetrical, cambered airfoil section can be employed as a mono plane, tri-plane, tandem wings, winglets, diamond or box wings or combinations thereof wing configurations.

The trailing edge flap hinge may be locked to create a fixed surface, or may be rotably attached to a modular wing trailing to create a moving surface adapted to be rotated for example, as a flight control surface.

All available cambered airfoil profile designs may be manufactured via modular manufacturing processes.

All available trailing edge flap, leading edge flap and slat sub-elements can be applied to the wing elements surface through a modular manufacturing process.

The symmetrical wings can be joined together to form larger span wings by virtue of their common connection system, which may be, for example, a stud-recess removable attachment.

During connection the flaps have a quick attachment feature that allows various semi-spans to be connected to allow interconnected driving of the adjacent flap surface, or, the connection can remain free allowing partial flapped sections of wing.

The symmetrical wings may be supplied in any cambered aerodynamic profile shape, for example and not by way of limitation, any chord up to ½ meter in length or longer; any semi-span for example and not by way of limitation up to ½ meter in length or longer; any taper ratio; and any sweep.

Cambered wing sub-elements may also be joined to symmetrical wing sub-elements and vice versa via their modular stud-recess attachment system.

In embodiments of the modular wing system of the invention both cambered and symmetric wing surfaces have provisions for access to their sub structure via their lower surfaces. Such access may be provided, for example, by an opening or aperture in the wing lower surface. The lower surface aperture may provide access to an internal structure that is compatible with LEGO®, DECOOL® or KAZI® for providing a removable attachment to a strut by way of a stud-recess removable attachment, allowing external bracing strut attachments to be used. As an alternative, such strut attachment to a lower surface of a wing sub-element may be provided by a protuberance or other structure formed in the lower surface of a wing sub-element, wherein such protuberance or other structure is adapted to attach to a strut by way of a stud-recess removable attachment or other attachment.

In any embodiment, the sub-elements of the system may be removably attached together using threaded fasteners such as, for example, any combination of male threaded fasteners and female threaded fasteners. Thus the invention may be assembled onto a toy system that utilizes the recess-stud system or may be assembled onto any structure using threaded fasteners.

Exemplary sub-elements may comprise leading edge (LE) or trailing edge (TE) wing sweeps. Non-limiting, exemplary dimensions for embodiments of the invention are:

WING-LONG-STRAIGHT: Span of 680 mm by 340 mm chord;
WING-SHORT-STRAIGHT: Span of 340 mm by 340 mm chord;
WING-SHORT-TAPER: Semi-span of 680 mm by 340 mm chord, Left Hand (LH) Leading Edge (LE) sweep;
WING-SHORT-TAPER: Semi-span of 680 mm by 340 mm chord, Right Hand (RH) Leading Edge (LE) sweep;
WING-SHORT-TAPER: Semi-span of 680 mm by 340 mm chord, Left Hand (LH) Trailing Edge (TE) sweep;
WING-SHORT-TAPER: Semi-span of 680 mm by 340 mm chord, Right Hand (RH) Trailing Edge (TE) sweep;
WING TIP: Semi-span of 340 mm chord Left Hand (LH);
WING TIP: Semi-span of 340 mm chord Right Hand (RH);
WING-LONG-STRAIGHT: Span of 680 mm by 192 mm chord;
WING-SHORT-STRAIGHT: Span of 340 mm by 192 mm chord;
WING-SHORT-TAPER: Semi-span of 340 mm by 192 mm chord, Left Hand (LH) Leading Edge (LE) sweep;
WING-SHORT-TAPER: Semi-span of 340 mm by 192 mm chord, Right Hand (RH) Leading Edge (LE) sweep;
WING-SHORT-TAPER: Semi-span of 340 mm by 192 mm chord, Left Hand (LH) Trailing Edge (TE) sweep; and
WING-SHORT-TAPER: Semi-span of 340 mm by 192 mm chord, Right Hand (RH) Trailing Edge (TE) sweep.

Referring now to FIG. 1, a perspective view of a sub-element of an embodiment of the invention attached via an internal stud-recess element is depicted. A modular wing or blade of the invention may comprise a plurality of sub-elements removably attached using the stud-recess removable attachment. In an embodiment, each of these sub elements can be added together to form larger wing structures adapted to be assembled with compatible elements from LEGO®, DECOOL® or KAZI®. The result can either be a static display model with an aerodynamic surface or a fully flying aerodynamic scale model that can be operated as a remotely controlled aircraft or hand thrown glider. Flap sub-element 118 may be rotably connected to modular wing sub-element 100 by a dowel, pin, axle or similar structure passing through bearing elements 102 and 103. Stud-recess attachment elements 104 and 105 (shown in FIG. 2) may be used to attach flap sub-element 100 to other flap sub-elements, or to an airplane fuselage, or windmill hub, or other structure as may be desired. The flexibility of the configuration allows the wing sub elements to be joined to create aerodynamic wing planform geometries of limitless combinations. The sub elements 100 can be used to create flying toy or model aircraft comprising wings with airfoil cross sections that produce lift, and thus such toy or model aircraft will be functional, flying aircraft. The wing sub elements can be combined with other block type toys using stud-recess attachment or other attachment systems, or can be used with standard remotely controlled aircraft flight controls and fastener hardware.

Figure 2:
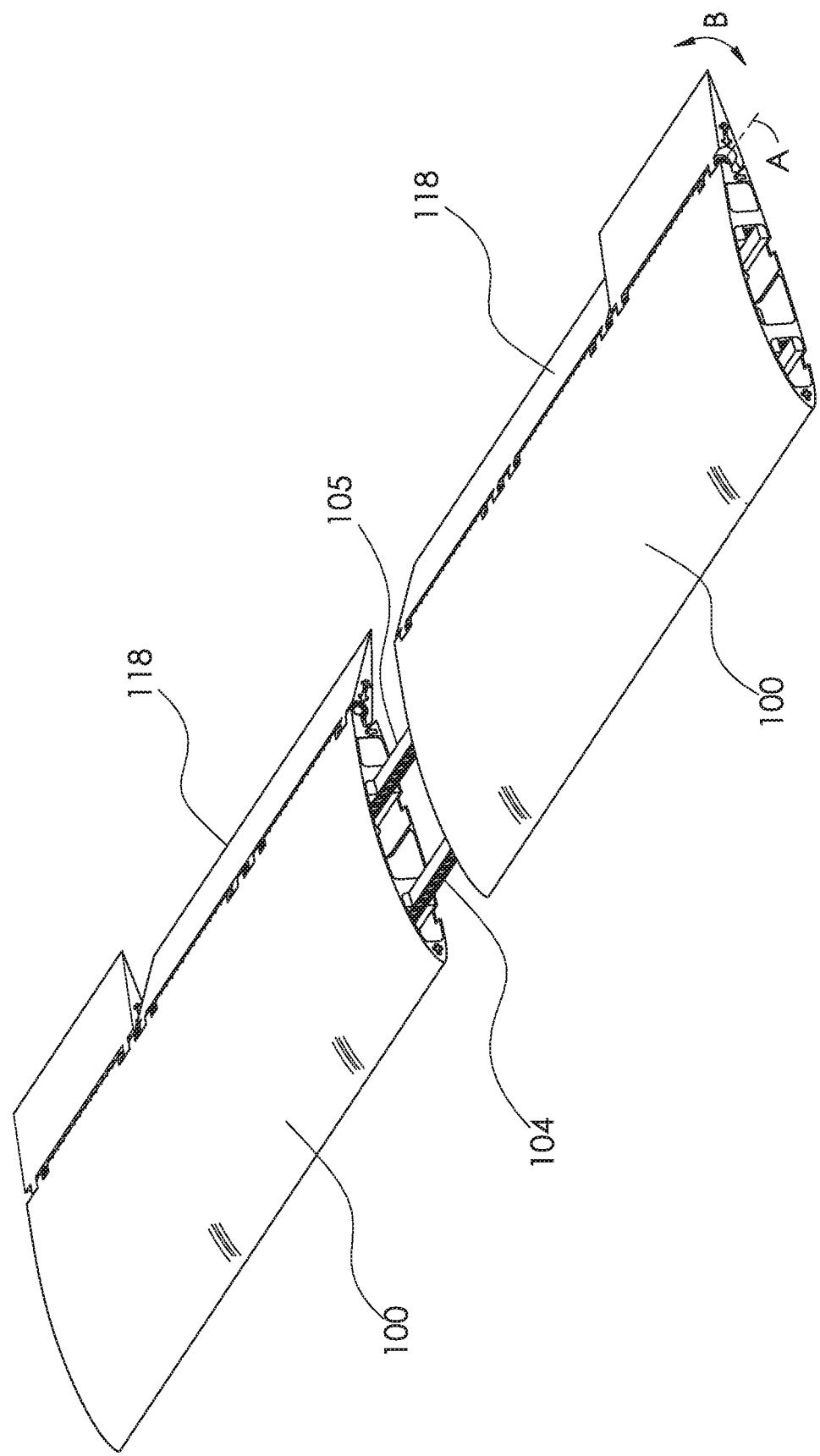
FIG. 2 depicts an example in which six wing sub-elements are attached together to form a full modular wing assembly.

Referring now to FIG. 2, the assembly of two modular wing sub-elements 100 of the invention to form a larger wing or blade structure is depicted. In this figure, the modular wing sub-elements 100 are depicted in the process of being brought together but have not yet been removably attached to one another. The removable attachment between the two sub-elements 100 is provided by stud-recess attachment elements 104 and 105. In this manner, a full wing or blade comprising at least one, and in differing embodiments, a plurality, of sub-elements 100 may be formed. The full wing or blade is reconfigurable by detaching the two wing elements 100 from one another and reconfiguring with different sub-elements as desired by the user. In this manner, longer or shorter wings or blades can be rapidly configured, allowing rapid reconfiguration and prototyping for meeting desired characteristics of the finished structure. As an example, if it desired to configure a wing with more lift, additional modular wing sections may be added, creating a longer wing. Flap sub-elements 118 are depicted for reference. The hinged attachment between sub-elements 100 and 118 and 118a is depicted, having an axis of rotation A about which sub-elements 118 and other sub-elements 118a, and so on, may rotate in the directions shown by arrow B.

Figure 3:
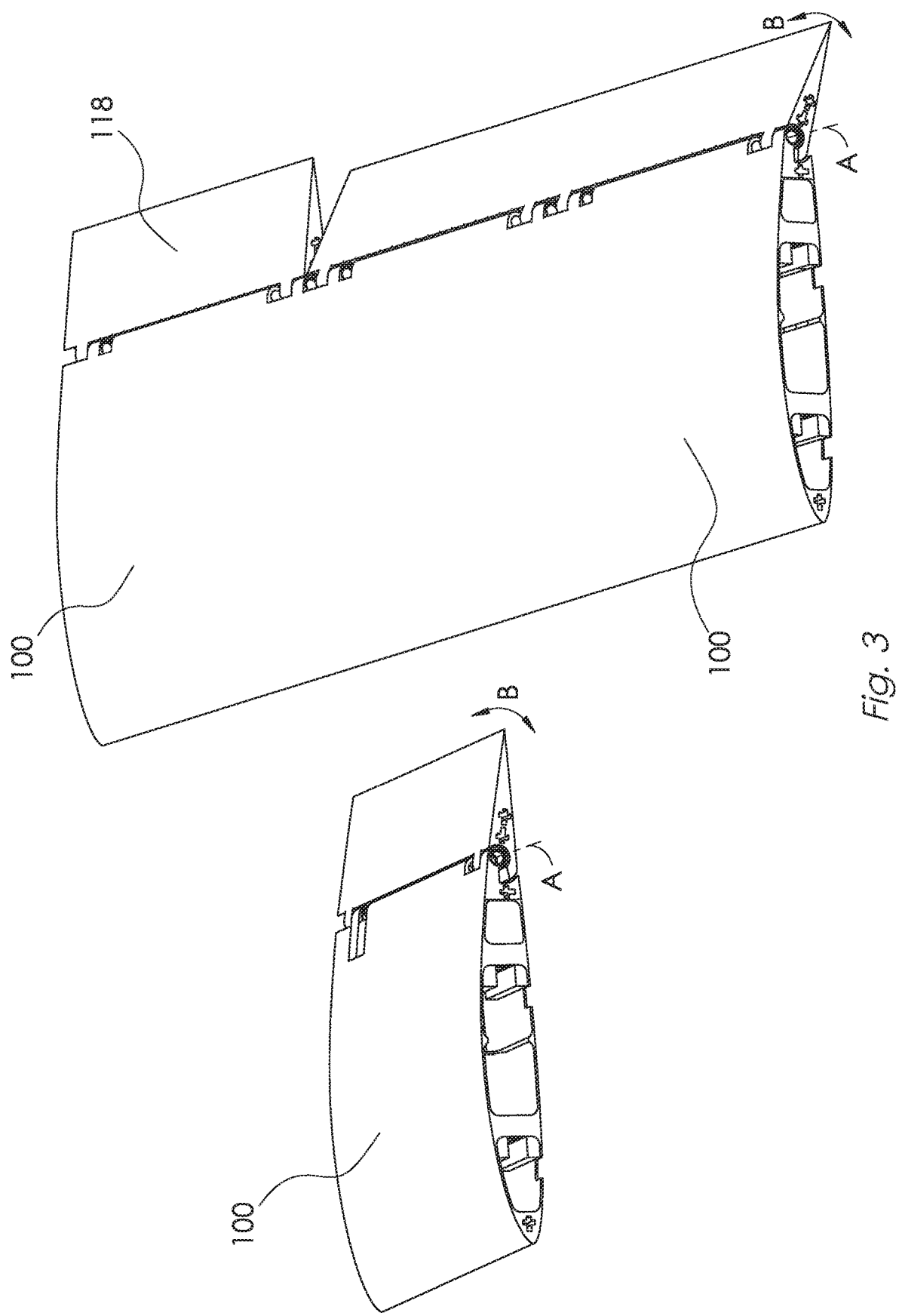
FIG. 3 depicts a plurality of modular wing sub elements attached to stud-recess elements to form a larger span wing, with the connecting stud-recess elements hidden within structure.
Figure 4:
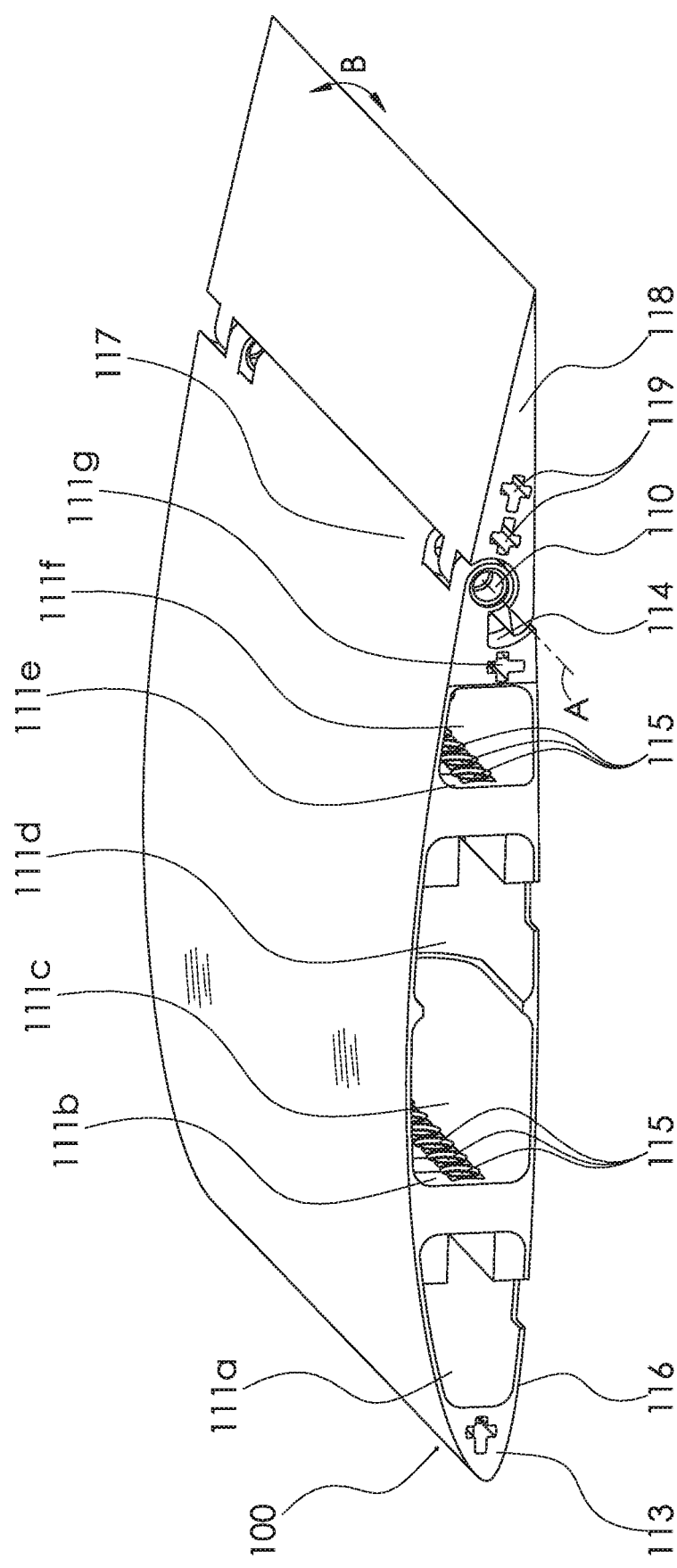
FIG. 4 depicts a perspective cross sectional view of an embodiment of a modular wing or blade of the invention depicting wing sub-elements attached to stud-recess elements via stud-recess element connections at the front and rear wing spar locations.
Figure 5:
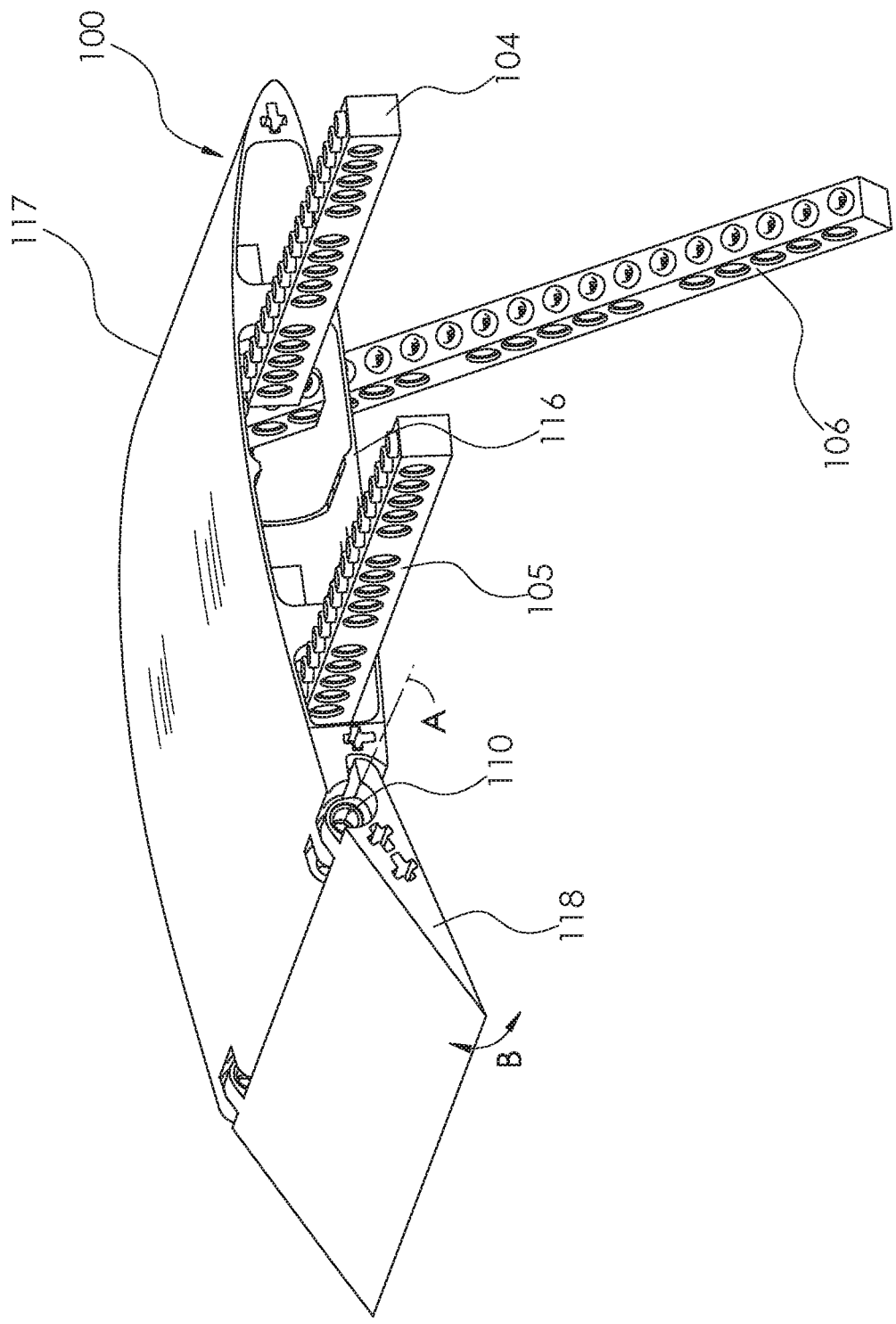
FIG. 5 depicts a perspective view of an embodiment of the wing sub-elements attachments using stud-recess elements.
Figure 6:
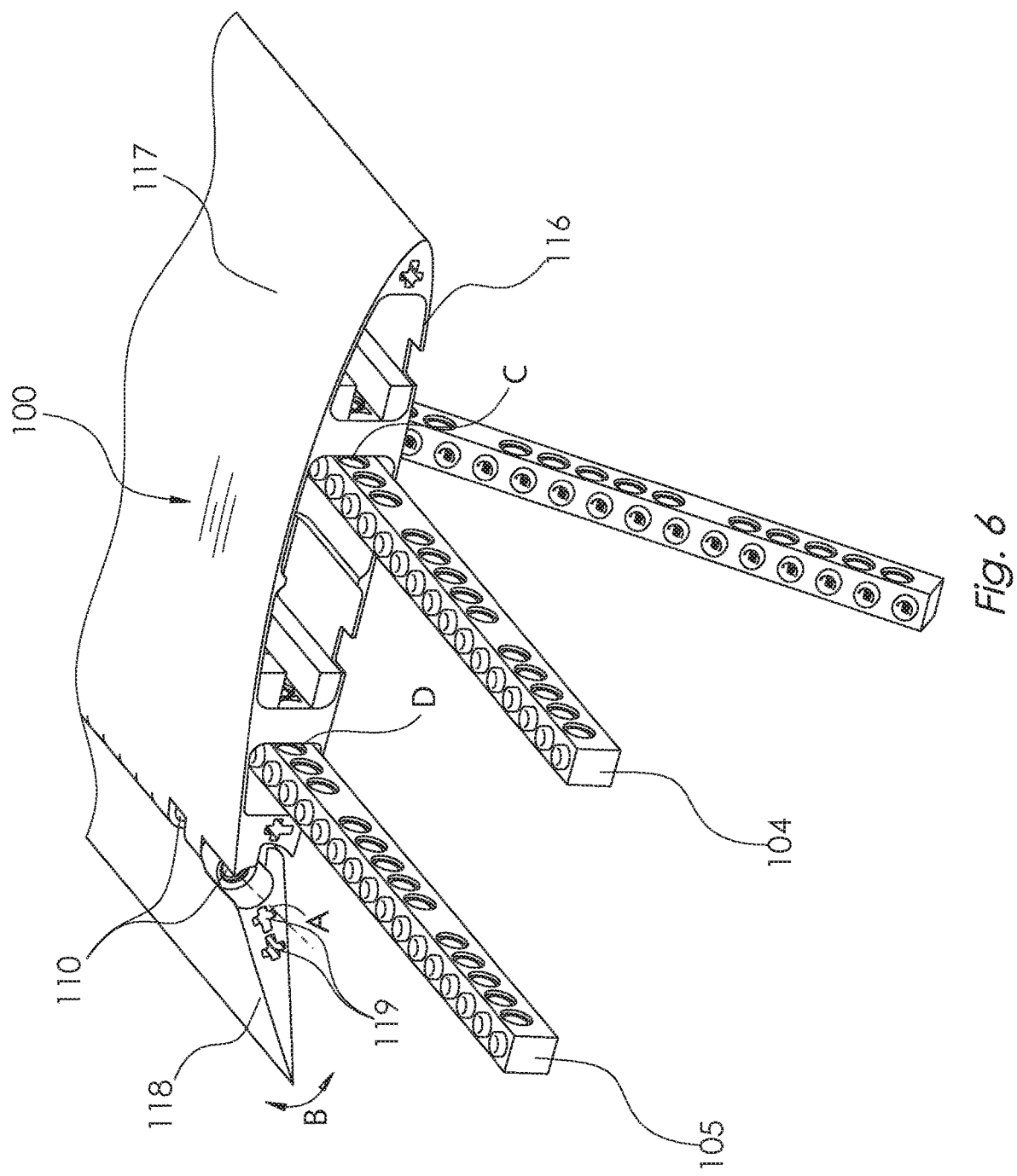
FIG. 6 depicts a perspective view of an embodiment of the invention in which flap elements of the invention are attached to wing elements of the invention at hinge points. Rear cross dowels are added to lock the surface in order to provide interconnection of flap to wing elements.

Referring now to FIG. 3, a modular wing of the invention is depicted, wherein two modular wing sub-elements 100 have been assembled together in a removable attachment using internal stud-recess attachment elements 104 and 105. It is not necessary that the two modular wing sub-elements 100 be of the same airfoil design; i.e. they may comprise any combination of cambered or symmetrical airfoil shaped.

Figure 9:
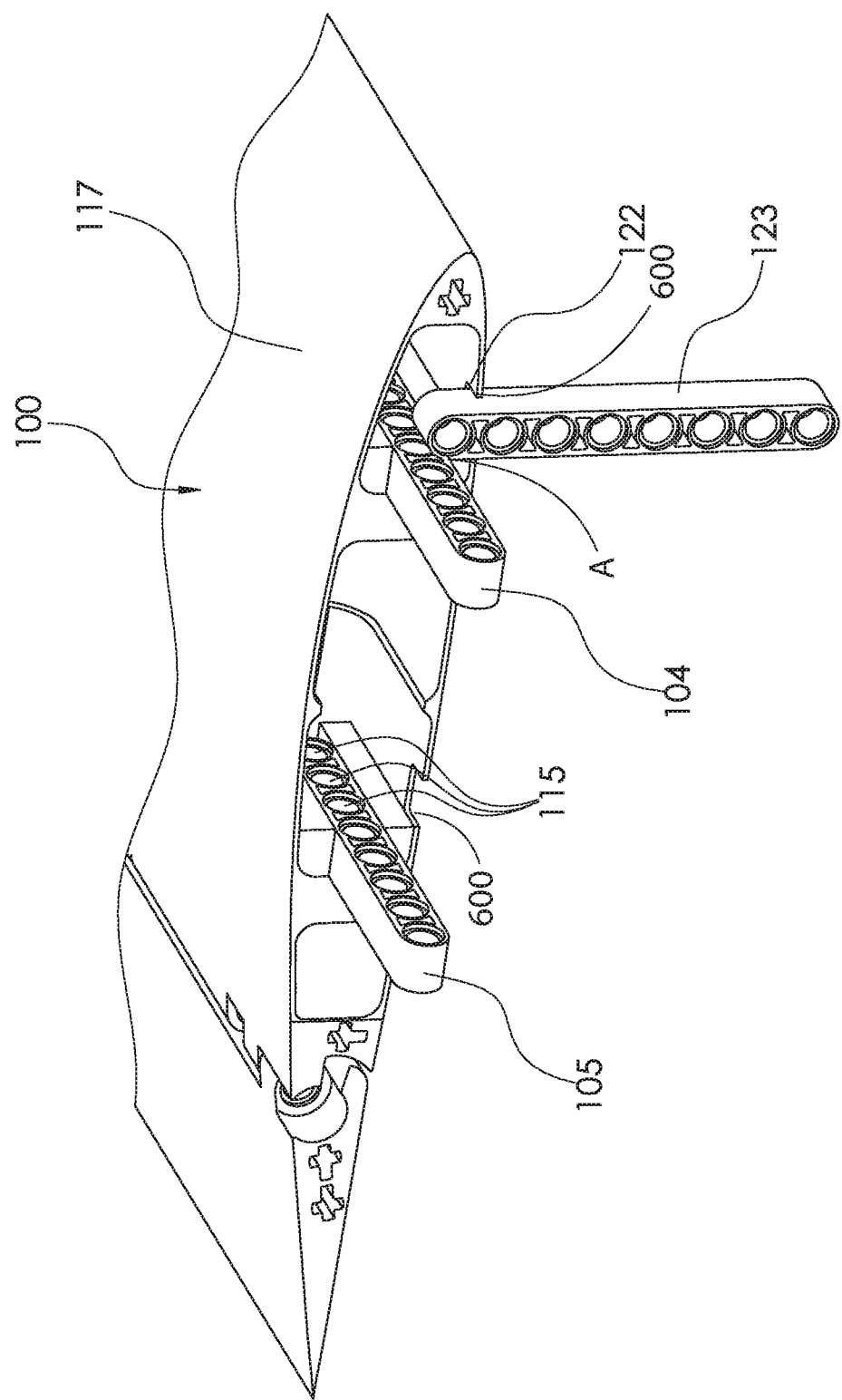
FIG. 9 depicts a perspective view of an exemplary embodiment of a slotted internal socket support structure at each end of the wing sub-element that may be used to allow the wing internal elements to mate. Also depicted is a free vertical member that can be pushed through holes in the underside of the wing to force the forward and rear spars to engage on their dowels at the wing spar. This approach may be used to join two or more sub elements together, and keeps the attachment structure internal to the wing, retaining the aerodynamic or hydrodynamic qualities of the external shape of the wing, blade or airfoil.

Referring now to FIGS. 4, 5, 6, 8 and 9, a perspective cross sectional view of an embodiment of a modular wing or blade sub-element of the invention, depicting wing sub-elements 100 attached to stud-recess elements via stud-recess element connections at the front and rear spar locations is depicted. The modular wing sub-element has an upper surface 117 and a lower surface 116 that together define an airfoil shape. The modular wing sub-element may comprise hollow sections or lengthwise voids 111a-111g which each may be separated by a wall, which serve to reduce the weight or mass of modular wing sub-element without significant loss of strength and stiffness. These voids may run lengthwise through the modular wing sub-element, allowing the sub-element to be fabricated by extrusion. A flap sub-element 118 may be attached to a trailing edge 114 of the modular wing sub-element. The attachment of flap element 118 to the trailing edge of the modular wing sub-element may be rotable about an axis of rotation A about a pin or axle (not depicted in FIG. 4) that is disposed in lengthwise void 110. Recesses 115 may be disposed in an internal structure of the modular wing, for example in an internal wall of the modular wing, for receiving studs in a removable stud-recess attachment such as attachment elements 104 or 105 (not depicted in FIG. 4 but depicted in FIGS. 1, 2, 3, 5 and 6) at the interface of surfaces at C and D, respectively. Modular wing sub-element leading edge 113, which is the leading edge of motivation for purposes of defining the direction of motivation of the airfoil of the invention through a fluid, is shown for reference. Flap sub-element 118 may comprise a flap receiving feature 119 is depicted as a "cross" cross section, but may be any cross sectional shape, and may be used to receiving a locking structure of complementary cross section in, for example, a sliding or slight press fit, allowing adjacent flaps to be locked together such that they may operate as a unitary structure, rotable about the axis formed by a dowel or pin running through lengthwise void 110, forming a hinge. A first end of an optional support strut 106 comprising stud-recess attachment elements which may be attached to a lower surface of a modular wing sub-element or to a structure internal to the modular wing sub-element using a stud-recess attachment. This may require the skin to be cut by the user, or if aligned with the skin access holes 122, this can mate to elements attached to the spar 106 that extend through these holes. A second end of spar 106 may be attached to a supporting structure, such as, by way of example, a fuselage. FIG. 9 depicts a perspective view of an exemplary embodiment of the slotted internal socket support structure at each end of the wing sub-element that is used to align the wing to internal elements. Also depicted is a free vertical member 123 that can be pushed through skin access holes 122 or 600 in the underside of the wing. The vertical action forcing the forward and rear spars to engage on their dowels while seated in the socket through the wing spar. This is used to join two internal sub elements together. The free vertical member 123 is then removed.

Figure 7:
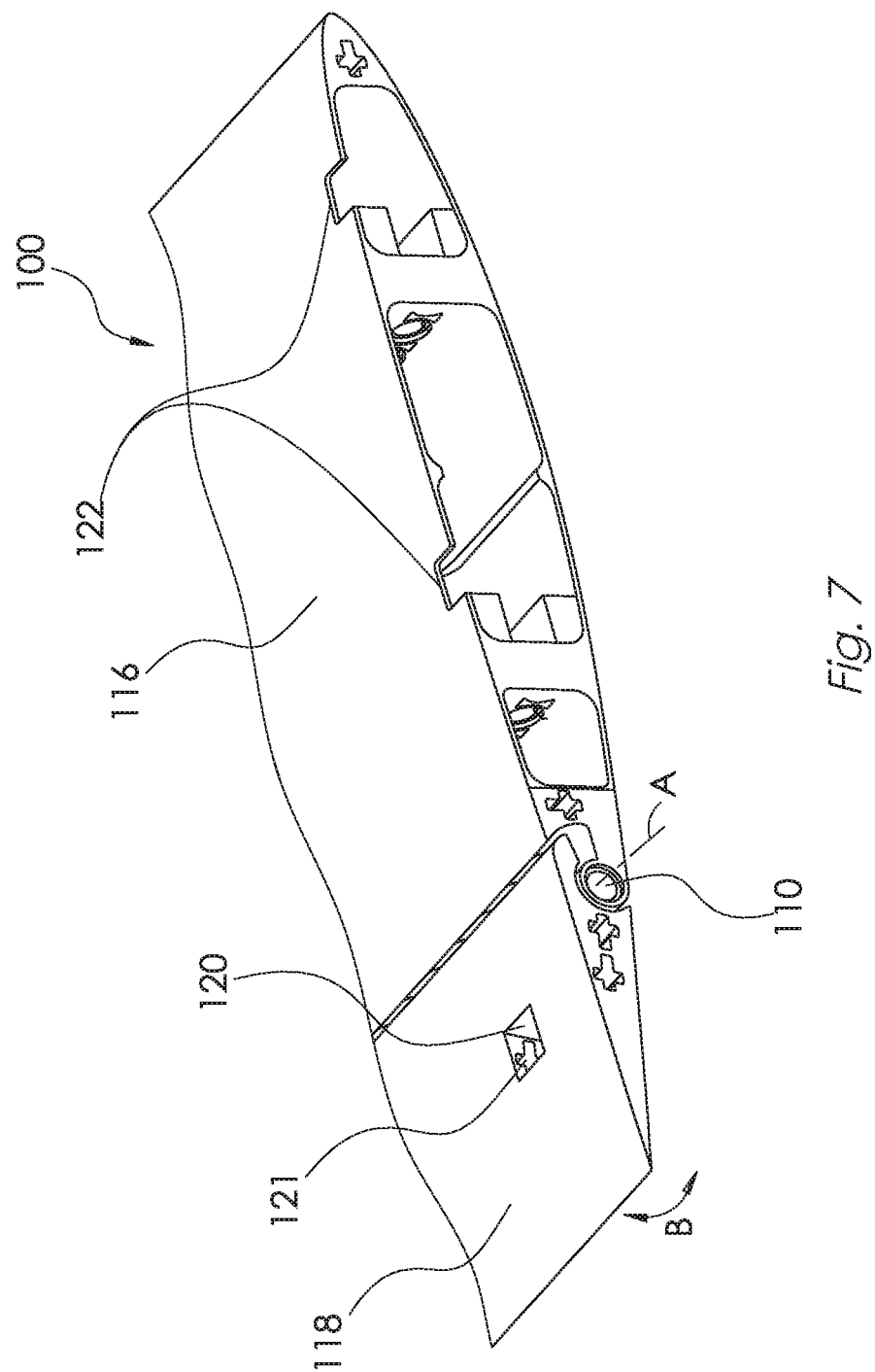
FIG. 7 depicts a perspective view, taken from underneath, of an embodiment of the invention in which flap surfaces comprise provisions and clearance to allow a variety of different surface lock pins and drive for control of flap position.
Figure 8:
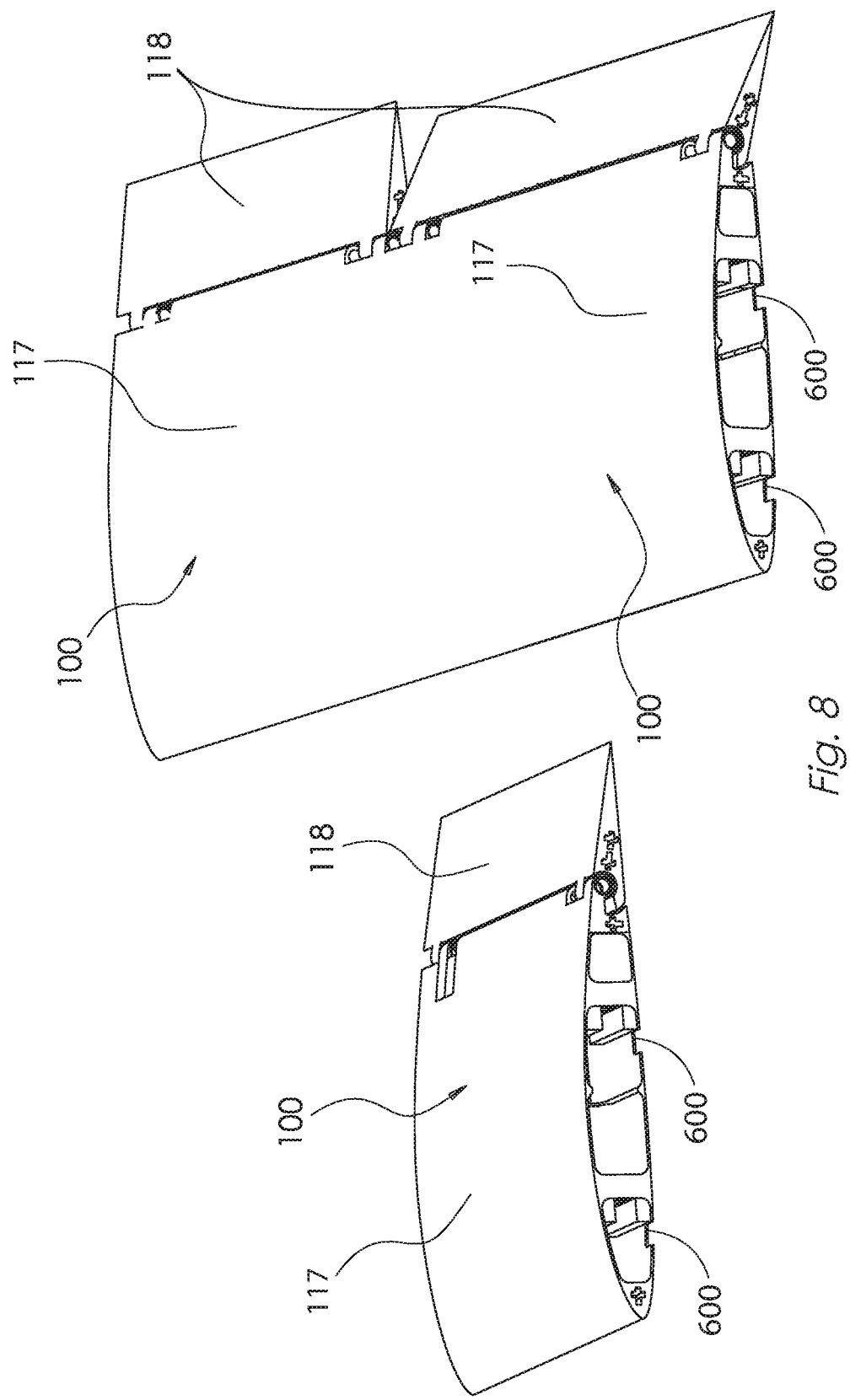
FIG. 8 depicts a perspective view of a large wing sub-element of an embodiment of the invention.

Referring now to FIG. 7, a perspective view, taken from underneath, of an embodiment of the invention in which flap surfaces comprise provisions and clearance to allow a surface lock pins and drives for control of flap position is depicted. Modular flap sub-element 110 may be hingedly or rotably attached to a trailing edge of a modular wing sub-element 100 by a pin or dowel inserted lengthwise through receiving structures in both the flag sub-element 118 and the trailing edge of the wing sub-element 100 forming axis of rotation A enabling rotation of sub-element 118 as depicted by arrows B. The pin or dowel (not depicted in FIG. 7) has a longitudinal axis that forms an axis of rotation A of the flap sub-element 118 relative to wing sub-element 100. To control the rotation B of the flap sub-element 118, it may be desirable to attach a strut sub-element (not depicted in FIG. 7). The strut sub-element may be attached to an underneath surface of flap 118 by a removable cross attachment 121 disposed in a structural protuberance 120 that is a part of, or attached to, an underneath surface of flap sub-element 118. The lower, or underneath, airfoil surface 116 of wing sub-element 100 is called out in the figure for reference.

Figure 10:
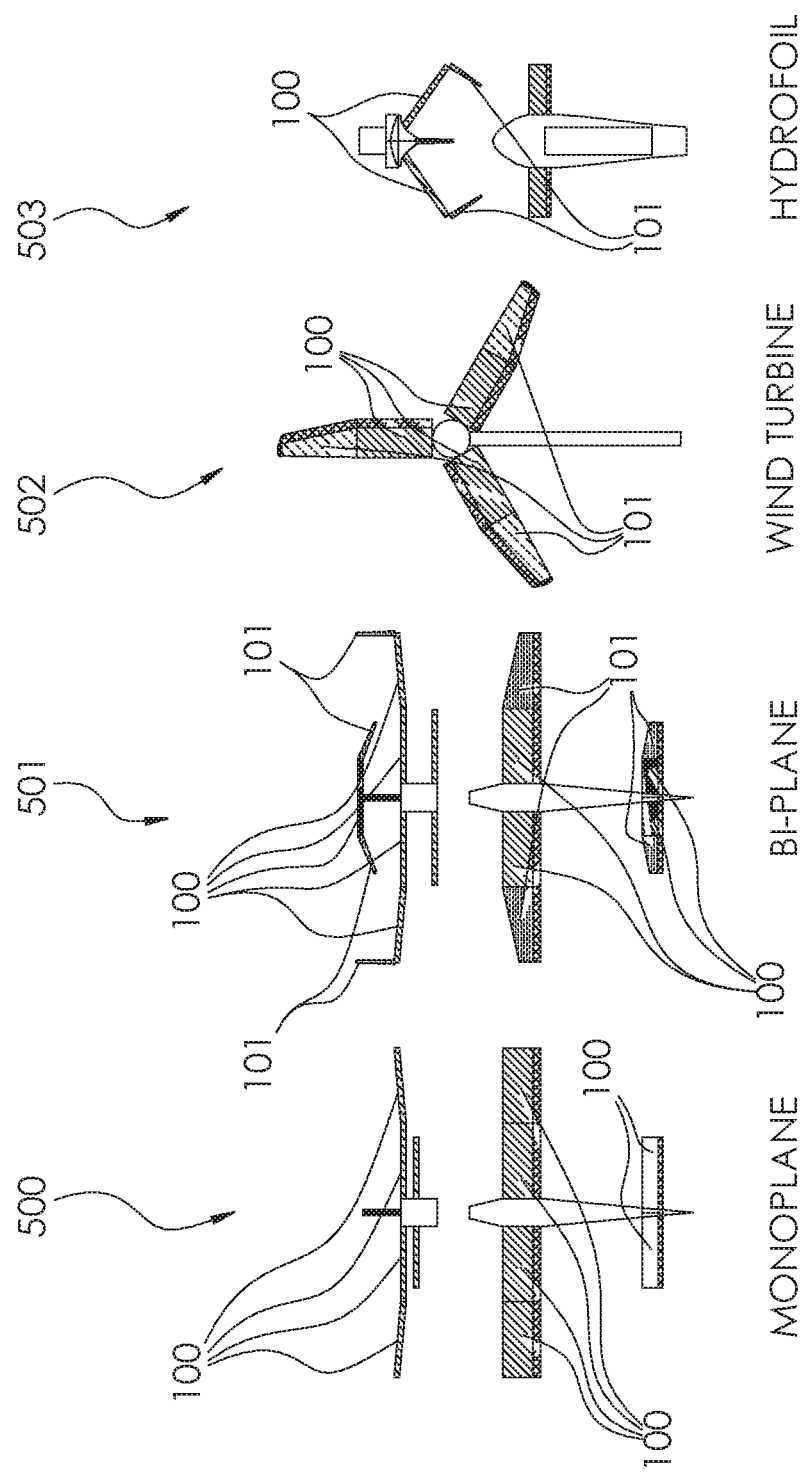
FIG. 10 depicts various exemplary embodiments of airplanes, windmills and other structures which may comprise modular wings or blades of the invention.

Referring now to FIG. 10, four exemplary structures comprising modular wing or blade assemblies of the invention are depicted. These exemplary structures are non-limiting; i.e. they are examples of but a few of the many structures which may comprise modular wing or blade assemblies of the invention. Each of the structures may comprise one or more wing sub-elements 100 or wing-tip sub-elements 101 as may be desired by a user. Thus, a monoplane structure 500, bi-plane structure 501, wind mill structure 502, or hydrofoil structure 503 may be created as desired by the user, using various combinations of the wing or blade sub-elements 100 and wing tip sub-elements 101.

Figure 11B:
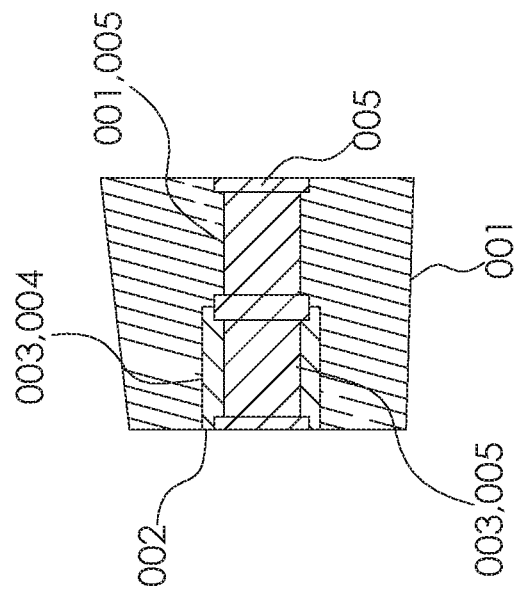
FIG. 11B depicts an exemplary stud-recess/dowel-hole attachment of the invention, after a first structure being removably attached to a second structure.
Figure 11A:
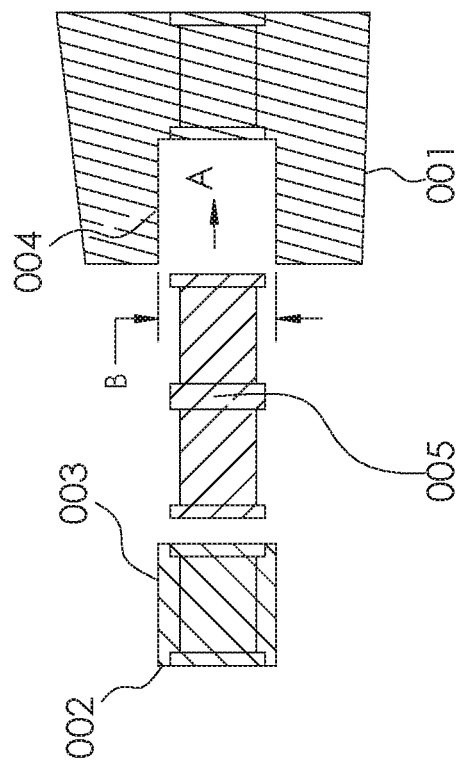
FIG. 11A depicts an exemplary stud-recess/dowel-hole attachment of the invention, prior to a first structure being removably attached to a second structure.

Referring now to FIGS. 11A and 11B, an embodiment of a non-limiting, exemplary stud-recess attachment of the invention is depicted. A first element or sub-element 001 may be attached to a second element or sub-element 002 by means of a socket 003 in first element 001 being inserted into a receiving recess 004 in second element 002 when first element 001 is motived towards second element 002 in the direction of arrow A. The fit between the outer dimension of stud 003 and inner dimension of recess 004, depicted as dimension B, may be a sliding fit, a slight press fit, or a full press fit resulting in a removable attachment between first element 001 and second element 002. In an embodiment, a permanent attachment may be realized between first element 001 and second element 002 by choosing the fit between the outer dimension of stud 003 and inner dimension of recess 004, depicted as dimension B to result in an interference fit between the outer dimension of stud 003 and inner dimension of recess 004 that a permanent attachment is formed between first element 001 and second element 002, and being locked in place by dowel element 005 FIG. 11B depicts a completed attachment between first element 001 and second element 002 utilizing a stud-recess attachment, which may result in either a permanent or a removable attachment between first element 001 and second element 002 and is locked in place by dowel element 005.

Figures 11C, 11D:
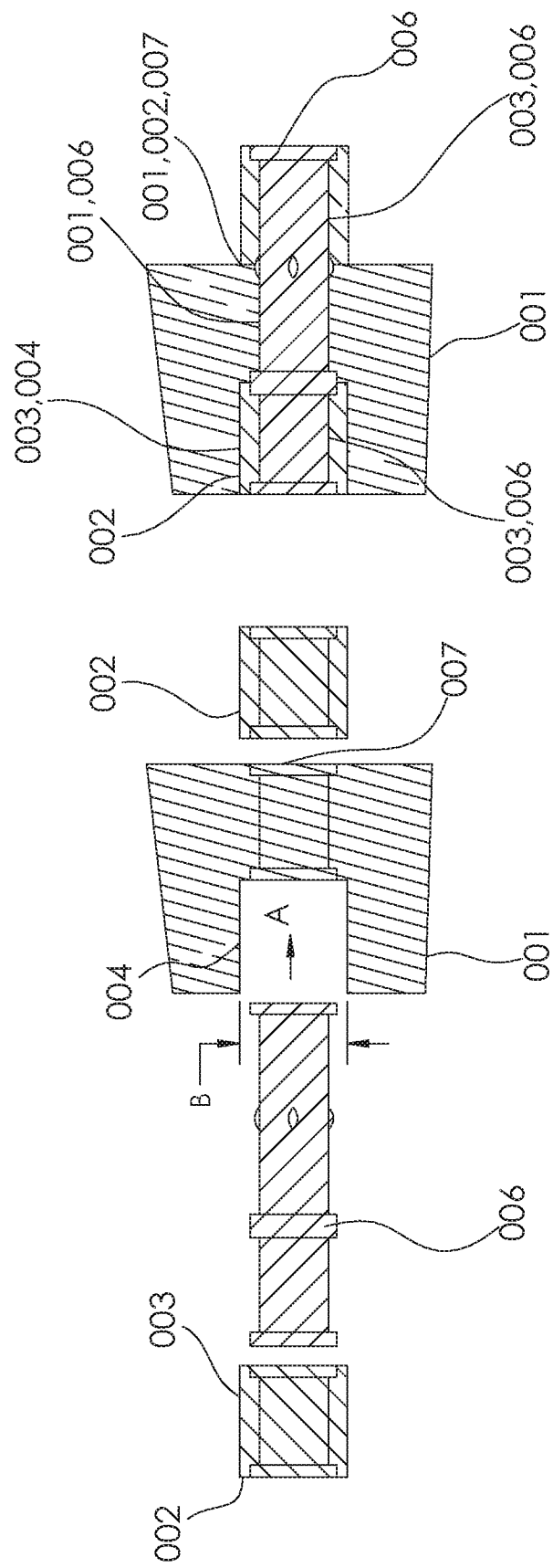
FIG. 11C depicts an exemplary stud-recess/dowel-hole attachment of the invention, prior to a first structure being removably attached to a second structure. This uses an optionally large dowel to mount parts on one side as a socket and the other side as a pinned truss.
FIG. 11D depicts an exemplary stud-recess/dowel-hole attachment of the invention, after a first structure being removably attached to a second structure. This uses an optionally large dowel to mount parts on one side as a socket and the other side as a pinned truss.

Referring now to FIGS. 11C and 11D, a non-limiting, exemplary stud-recess attachment of the invention is depicted. A first element 001 may be attached to a second element 002 by means of a socket 003 in first element 001 being inserted into a receiving "recess" 004 in second element 002 when first element 001 is motived towards second element 002 in the direction of arrow A. The fit between the outer dimension of stud 003 and inner dimension of recess 004, depicted as dimension B, may be a sliding fit, a slight press fit, or a full press fit resulting in a removable attachment between first element 001 and second element 002. In an embodiment, a permanent attachment may be realized between first element 001 and second element 002 by choosing the fit between the outer dimension of stud 003 and inner dimension of recess 004, depicted as dimension B to result in an interference fit between the outer dimension of stud 003 and inner dimension of recess 004 that a permanent attachment is formed between first element 001 and second element 002, and being locked in place by dowel element 006. In addition as the dowel element is longer an additional element 002 can be attached to the rear to reduce the load in the socketed element. FIG. 11D depicts a completed attachment between first element 001 and second element 002 utilizing a stud-recess attachment, which may result in either a permanent or a removable attachment between first element 001 and second element 002 and is locked in place by dowel element 006.

Figure 12:
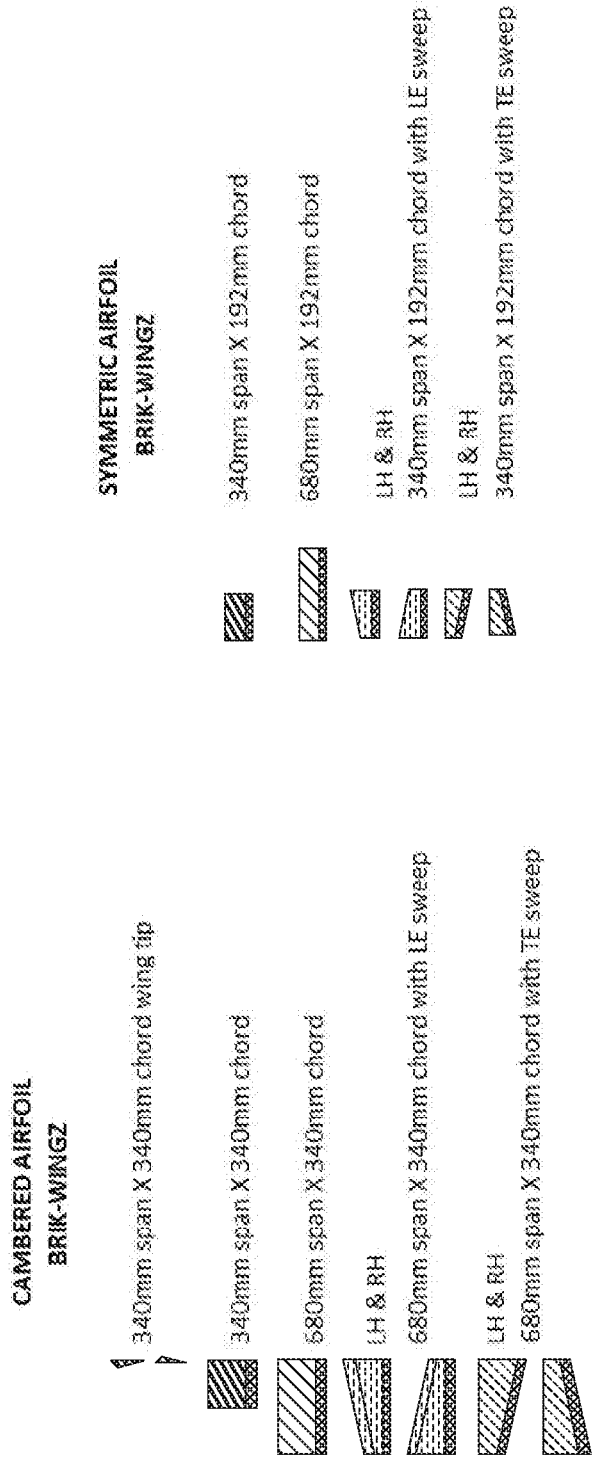
FIG. 12 depicts exemplary planforms of cambered and symmetric airfoil shapes and dimensions comprising specific embodiments of the invention.

Referring now to FIG. 12, typical dimensions for cambered and symmetrical sub-elements of the invention are depicted. These dimensions are depicted as exemplary, and not as limiting.

Figure 13:
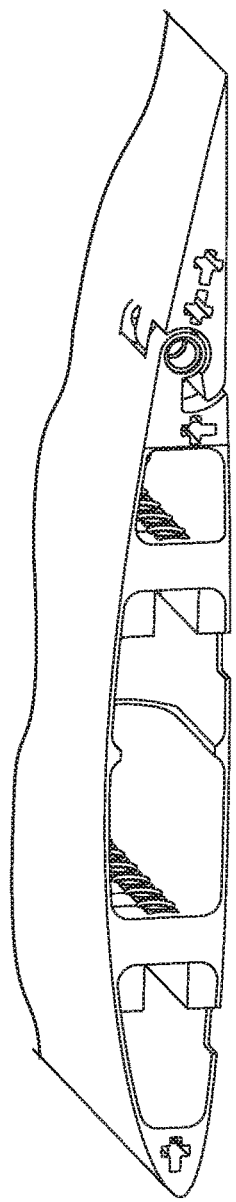
FIGS. 13-20 depict embodiments of the invention designed for improved manufacturability.

FIG. 13 depicts one embodiment of a wing or airfoil of the invention. FIGS. 14-20 depict an alternate embodiment of the invention.

FIGS. 14 and 17-20 depict an alternate embodiment of the invention in which a top portion of the airfoil sub-element and a bottom portion of the airfoil sub-element are fabricated separately and then assembled together to create a completed sub-element.

Figure 14:
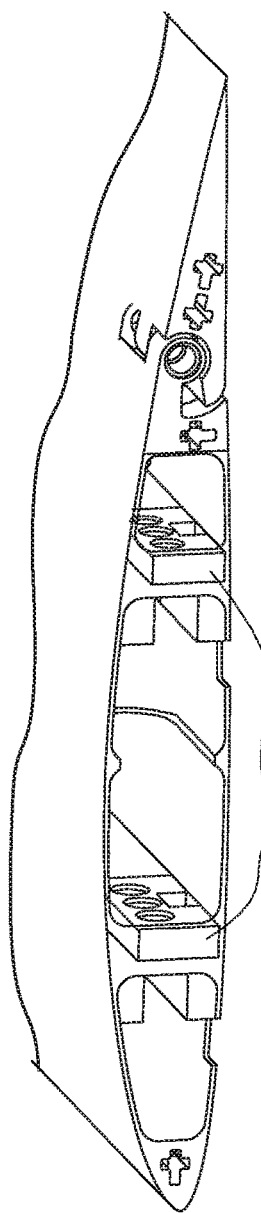

FIG. 14 depicts an alternate embodiment of the invention in which a modular wing of the invention, adapted to be used on a flying device such as a toy airplane, drone, or other small fixed wing flying device, or form a part of a wind turbine or any other apparatus that requires a wing or blade, is compatible with block-based toy systems such as LEGO®, DECOOL® or KAZI® utilizing stud-and-receiver attachment. The modular wing may be comprised of a series of modular aerodynamic surfaces that may be suitable for manufacture by a low-cost method such as molding or additive manufacturing such as 3D printing, typically but not necessarily from plastic, to form wing sub elements which, when assembled together, form a wing or blade such as an airplane wing or turbine blade. The modular wing may comprise cambered or symmetric wing shapes, the updated version being formed by a manufacturing process that captures the toy brick elements within the design 601, 602. The toy brick elements comprise receiver features in order to accomplish stud-and-receiver attachment with, for example, stud-recess attachment elements 104 and 105 as depicted in FIG. 2. The alternate embodiment of FIG. 14 includes the options for two embedded bricks, however embodiments of the invention may include options for containing any number of embedded bricks. In this figure item 601 is a front embedded brick and item 602 is a rear embedded brick. By utilizing this approach for capturing embedded bricks within a wing element or sub-element of the invention, low-cost manufacturing processes such as extruding, molding, and 3-D printing are enabled.

Figure 15:
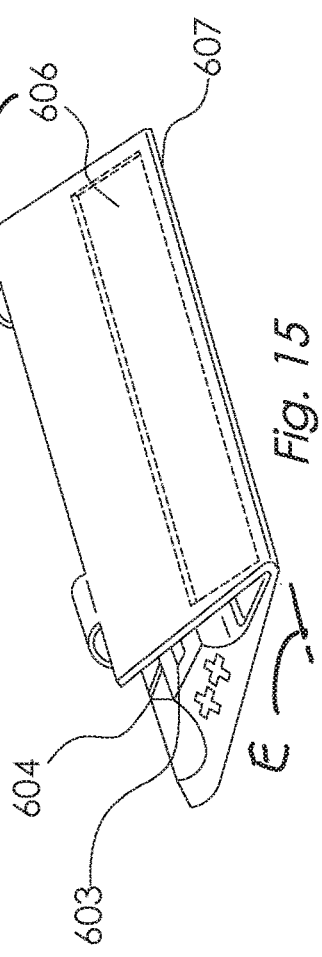
Figure 16:
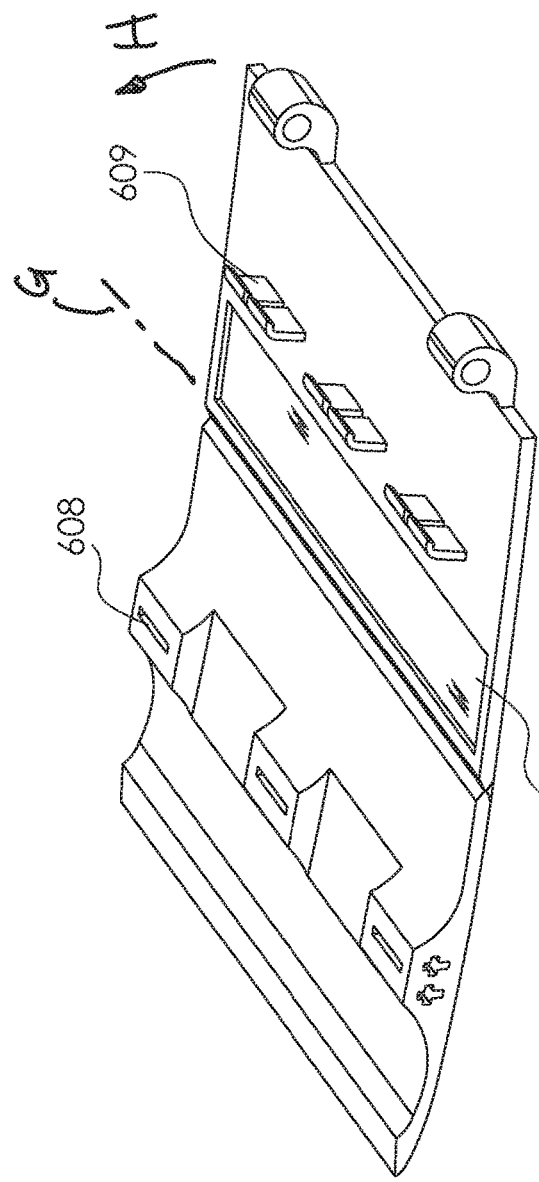

FIGS. 15 and 16 depict alternative embodiments of an airfoil of the invention in which the airfoil is manufactured by any manufacturing process including but not limited to 3D printing, molding including injection molding, extrusion or any other manufacturing process, and then folded into shape.

FIG. 15 depicts a view of a folded alternate embodiment of a flap of the invention designed for production manufacturing process. This alternative flap configuration is comprised of a male and female assembly where the part may be fabricated as a flat piece that is then folded about the trailing edge of the part. In FIG. 15, item 603 is a male and female assembly; item 604 is a web; item 605 retains the original hinge hole design; item 606 is a thin embodiment of the skin; item 607 is the folded trailing edge which enabled to fold along fold axis E indirection F due to the cross section of skin along folding edge 607 to be thin enough to allow folding without rupture or other mechanical failure of the material comprising the sub-element which may be, for example, any plastic. Features of this embodiment may include male and female complementary features that are engaged in press fit or snap fit captured the folded portions together FIG. 16 depicts a view of an unfolded flap embodiment designed for production manufacturing process. The unfolded configuration is comprised of a part that can be injection molded in one piece. Item 608 is a groove. Item 609 are male 'stays' for male to female assembly into receiving complementary groove(s) 608 in a press fit when folded about fold axis G in direction H. Item 610 is a thin embodiment of the skin.

Figure 17:
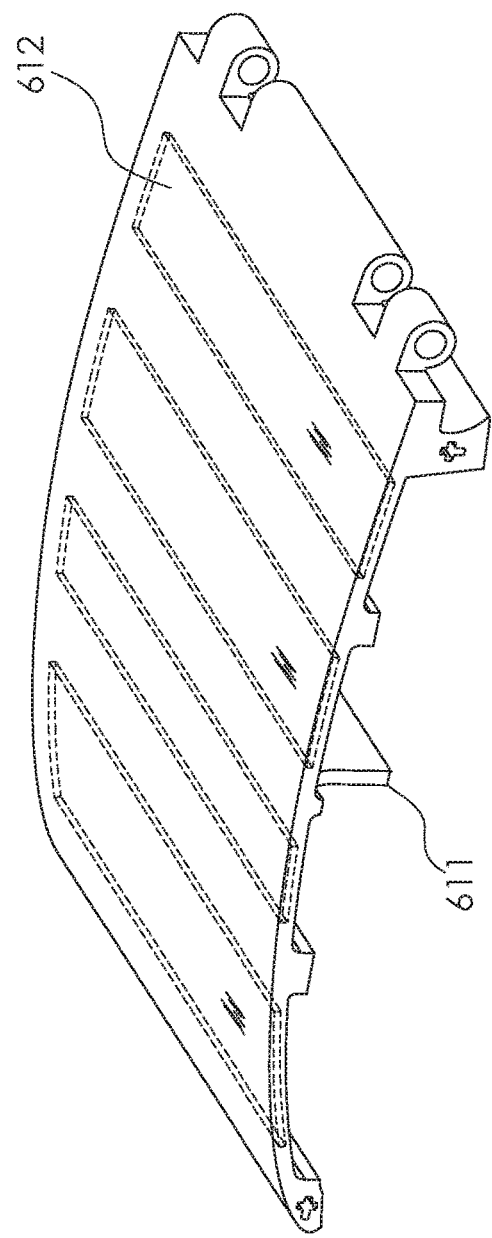

FIG. 17 depicts an alternate embodiment of a main upper airfoil configuration, designed for production manufacturing process. The upper airfoil configuration is unconnected to lower airfoil surface. The base and upper surface can be separated to improve general accessibility. General configuration as previously defined below. The part may be formed from one piece of extruded plastic. Item 611 is a web element. Item 612 is a thin embodiment of the skin.

Figure 18:
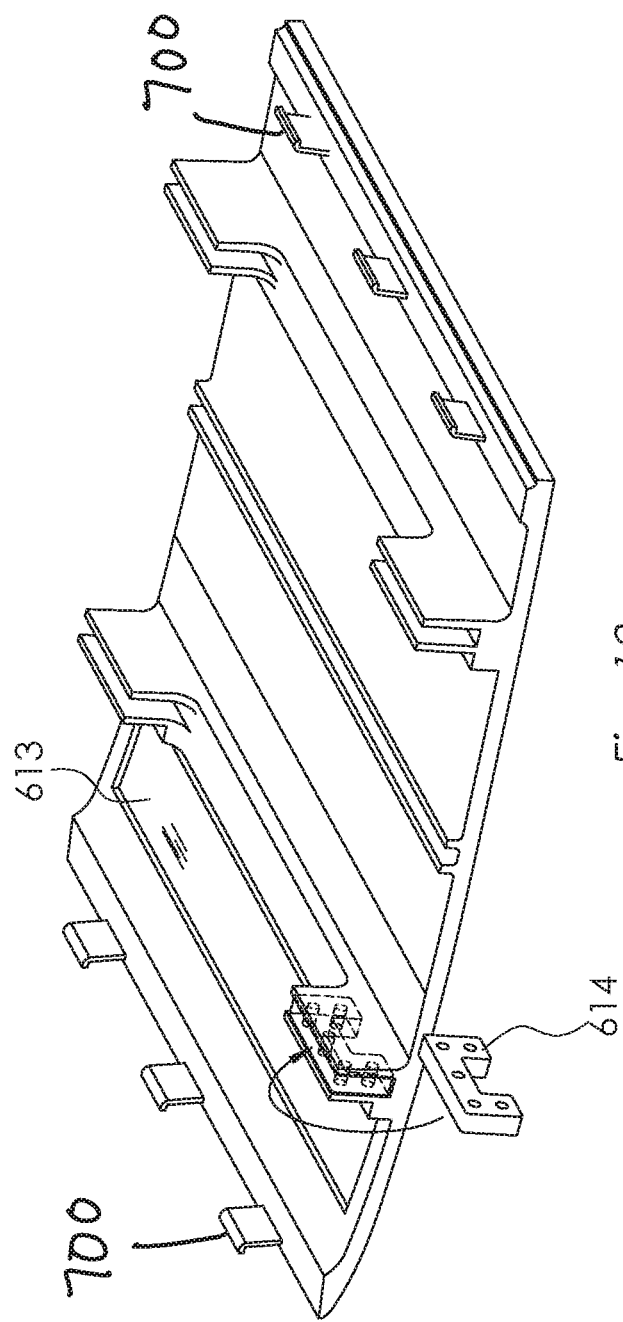

FIG. 18 depicts an alternate embodiment of the main lower airfoil configuration which is designed for production manufacturing process. In this view the lower airfoil is unconnected to upper airfoil surface. The base and upper surface may be separated to improve general accessibility. Item 613 is a web. Item 614 is a brick captured by features 601 and 602. Male features 700 are adapted to create a press fit with complementary female features located in underneath surfaces of the upper portion the airfoil when motivated towards and against the underneath surface of the upper portion of the airfoil in a press or snap fit. Thus the upper portion of the airfoil depicted in FIG. 17 and the lower portion of the airfoil depicted in FIG. 18 are assembled together in a press fit or snap fit, resulting in an assembled air foil as depicted in FIG. 14.

Figure 19:
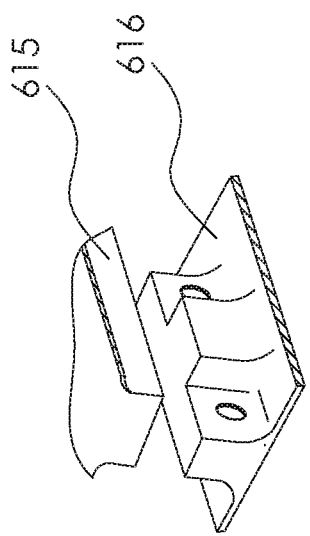

FIG. 19 depicts an example of a capture location. Item 615 is an upper surface at a capture location with the brick not installed. Item 616 is a lower surface at a capture location with the brick not installed.

Figure 20:
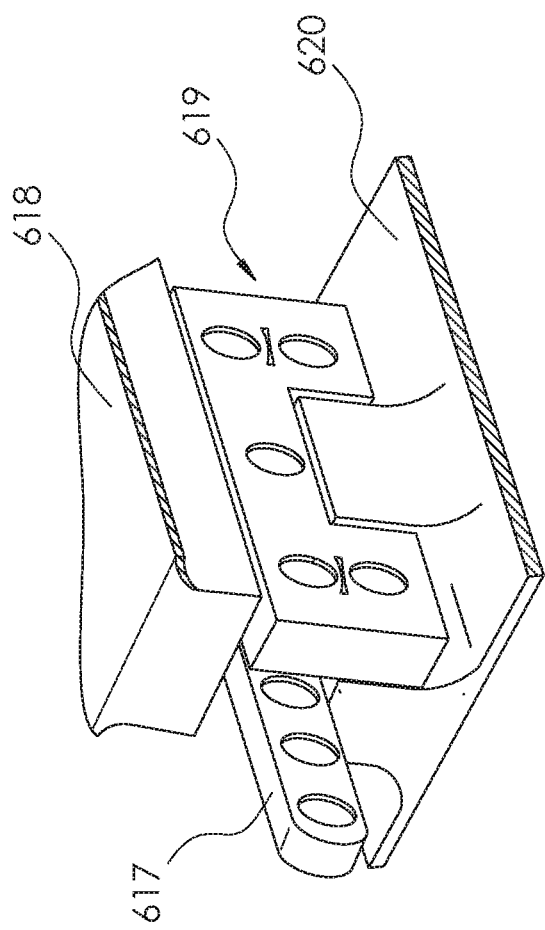

FIG. 20 depicts a sample of a capture location with the bricks installed. The number and location of such capture locations may vary depending on airfoil size. Any quantity and location is covered by the design. Item 617 may be any brick, for example, a mating spar brick comprising a stud and recess capture scheme, joining 'n' brick to 'spar brick at top two stud holes. Item 618 is a brick comprising a stud and recess capture scheme, joining lower surface to bottom two stud holes. Item 619 is a lower surface at a capture location, with the brick not installed. Item 620 is a lower surface at capture location, with brick installed.

INDUSTRIAL APPLICABILITY

The present invention solves the problem of providing rapidly reconfigurable, inexpensive, wing or blade structures for attachment to airplane structures, wind mill or wind turbine structures, rotary aircraft structures, or other structures as may be desired by a user.

The invention comprises a modular wing, adapted to be used on a flying device such as a toy airplane, drone, or other small fixed wing flying device, or form a part of a wind turbine or any other apparatus that requires a wing or blade, that is compatible with all block-based toy systems such as LEGO®, DECOOL® or KAZI®. The modular wing is comprised of a series of modular aerodynamic surfaces that may be suitable for manufacture by a low-cost method such as molding or additive manufacturing such as 3D printing, typically but not necessarily from plastic, to form wing sub elements which, when assembled together, form a wing or blade such as an airplane wing or turbine blade.

The modular wing or blade of the invention may comprise either cambered or symmetric wing shapes. The modular wing may be used in a static display model or a fully flying aerodynamic aircraft.

The flexibility of the configuration allows the wing sub elements to be joined to create aerodynamic wing planform geometries of limitless combinations.

I claim:
1. A reconfigurable, modular airfoil system, comprising:
a section of an airfoil wherein said section is removably attachable to a structure by a removable attachment, and wherein said section comprises an airfoil upper surface and an airfoil lower surface forming said airfoil;
said section comprising a plurality of modular airfoil sub-elements, each modular airfoil sub-element comprising a sub-element upper surface and a sub-element lower surface, and at least one end face;
each sub-element removably attachable to an attachment element;
wherein each modular airfoil sub-element is removably attachable to an adjacent sub-element via said attachment element, an end face of each modular airfoil sub-element adjacent to an end face of an adjoining modular airfoil sub-element
wherein the upper surfaces each modular airfoil sub-element of the plurality of airfoil sub-elements together form the upper surface, and the lower surfaces each airfoil sub-element of the plurality of airfoil sub-elements together form the upper surface;
wherein the airfoil system is reconfigurable by removably attaching as many, or as few, modular airfoil sub-elements together as may be desired by a user, so as to achieve a desired airfoil configuration.

2. The reconfigurable, modular airfoil system of claim 1, wherein said removable attachments are further defined as comprising a stud-recess/dowel-hole attachment.

3. The reconfigurable, modular airfoil system of claim 2, wherein said airfoil is further defined as forming a cambered airfoil.

4. The reconfigurable, modular airfoil system of claim 3, wherein each of said cambered and each of said symmetrical airfoil sub-elements are further defined as having an airfoil trailing edge, and wherein the trailing edge of each of said cambered airfoil sub-elements and each of said symmetrical airfoil sub-elements comprises a receiving structure for receiving a flap in a rotable attachment.

5. The reconfigurable, modular airfoil system of claim 4, wherein each trailing of said plurality of modular airfoil sub-elements together form a contiguous trailing edge; and wherein said modular airfoil system further comprises a flap extending along at least a portion of said contiguous trailing edge, said flap rotatably connected to at least one said receiving structure.

6. The reconfigurable, modular airfoil system of claim 2, wherein said airfoil is further defined as forming a symmetrical airfoil.

7. The reconfigurable, modular airfoil system of claim 6, wherein each of said cambered and each of said symmetrical airfoil sub-elements are further defined as having an airfoil trailing edge, and wherein the trailing edge of each of said cambered airfoil sub-elements and each of said symmetrical airfoil sub-elements comprises a receiving structure for receiving a flap in a rotable attachment.

8. The reconfigurable, modular airfoil system of claim 7, wherein each trailing of said plurality of modular airfoil sub-elements together form a contiguous trailing edge; and wherein said modular airfoil system further comprises a flap extending along at least a portion of said contiguous trailing edge, said flap rotatably connected to at least one said receiving structure.

9. The reconfigurable, modular airfoil system of claim 2, wherein each of modular sub-elements are further defined as having an airfoil trailing edge, and wherein the airfoil trailing edge of each of said modular airfoil sub-elements comprises a receiving structure for receiving a flap in a rotable attachment.

10. The reconfigurable, modular airfoil system of claim 9, wherein each trailing of said plurality of modular airfoil sub-elements together form a contiguous trailing edge; and wherein said modular airfoil system further comprises a flap extending along at least a portion of said contiguous trailing edge, said flap rotatably connected to at least one said receiving structure.

11. The reconfigurable, modular airfoil system of claim 2, further comprising a wingtip modular sub-element having an wingtip end face that is removably attachable to a modular airfoil sub-element end face.

12. The reconfigurable, modular airfoil system of claim 1, wherein said airfoil is further defined as forming a cambered airfoil.

13. The reconfigurable, modular airfoil system of claim 12, wherein each of said cambered and each of said symmetrical airfoil sub-elements are further defined as having an airfoil trailing edge, and wherein the trailing edge of each of said cambered airfoil sub-elements and each of said symmetrical airfoil sub-elements comprises a receiving structure for receiving a flap in a rotable attachment.

14. The reconfigurable, modular airfoil system of claim 13, wherein each trailing of said plurality of modular airfoil sub-elements together form a contiguous trailing edge; and wherein said modular airfoil system further comprises a flap extending along at least a portion of said contiguous trailing edge, said flap rotatably connected to at least one said receiving structure.

15. The reconfigurable, modular airfoil system of claim 1, wherein said airfoil is further defined as forming a symmetrical airfoil.

16. The reconfigurable, modular airfoil system of claim 15, wherein each of said cambered and each of said symmetrical airfoil sub-elements are further defined as having an airfoil trailing edge, and wherein the trailing edge of each of said cambered airfoil sub-elements and each of said symmetrical airfoil sub-elements comprises a receiving structure for receiving a flap in a rotable attachment.

17. The reconfigurable, modular airfoil system of claim 16, wherein each trailing of said plurality of modular airfoil sub-elements together form a contiguous trailing edge; and wherein said modular airfoil system further comprises a flap extending along at least a portion of said contiguous trailing edge, said flap rotatably connected to at least one said receiving structure.

18. The reconfigurable, modular airfoil system of claim 1, wherein each of said modular airfoil sub-elements is further defined as having an airfoil trailing edge, and wherein the airfoil trailing edge of each of said modular airfoil sub-elements comprises a receiving structure for receiving a flap in a rotable attachment.

19. The reconfigurable, modular airfoil system of claim 18, wherein each trailing of said plurality of modular airfoil sub-elements together form a contiguous trailing edge; and wherein said modular airfoil system further comprises a flap extending along at least a portion of said contiguous trailing edge, said flap rotatably connected to at least one said receiving structure.

20. The reconfigurable, modular airfoil system of claim of claim 18, further comprising an opening in the lower surface of at least one of said sub-elements for allowing a connecting element to pass there through and to attach to an internal structure of said sub-element in a stud-recess attachment.

21. The reconfigurable, modular airfoil system of claim 1, further comprising a wingtip modular sub-element having an wingtip end face that is removably attachable to a modular airfoil sub-element end face.

22. The reconfigurable, modular airfoil system of claim 1, wherein said airfoil forms a portion of an airplane wing.

* * * * *